Patented Aug. 30, 1927.

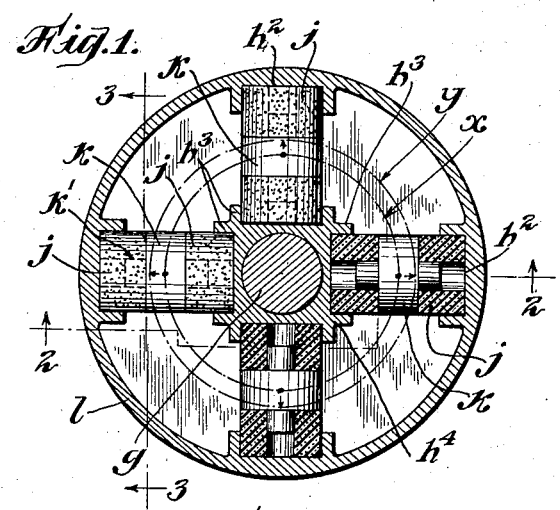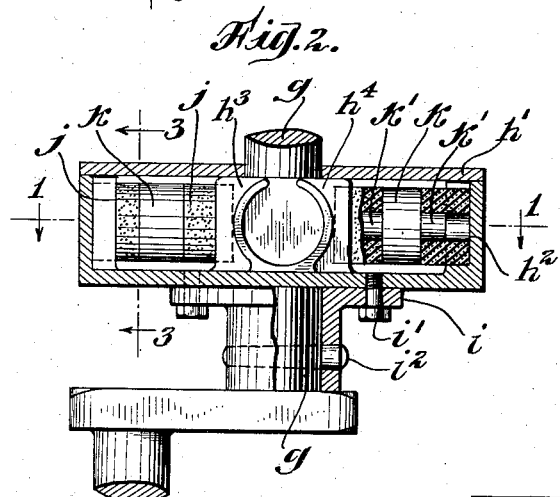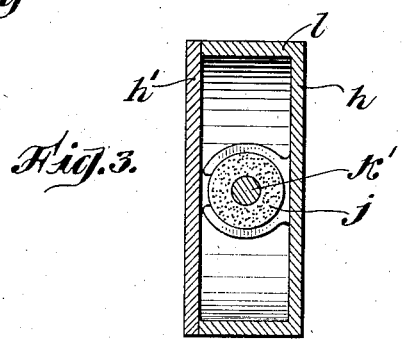

1,640,788

UNITED STATES PATENT OFFICE.

ALFRED F. MASURY, OF NEW YORK, N. Y., ASSIGNOR TO INTERNATIONAL MOTOR COMPANY, OF NEW YORK, N. Y., A CORPORATION OF DELAWARE.

VIBRATION DAMPENER.

Original application filed April 23, 1926, Serial No. 104,242. Divided and this application filed November 12, 1926. Serial No. 148,024.

The present application is a division of the application of Alfred F. Masury, Ser. No. 104,242, filed April 23, 1926.

In the construction of motors of the modern internal combustion type, where four, six or more cylinders deliver power to a single crank shaft, it has been found that there exists a certain point in the speed curve of the motor where violent destructive vibration occurs. This has presented a serious obstacle in properly mounting the motor and providing a design which insures smooth operation over the complete range of the load or speed characteristic curve.

The cause of the above vibration is the fact that at such point, or speed of operation, the power impulses imparted to the crank shaft from the individual sources, cumulate the torsional stresses set up in the crank shaft as a result of its inherent characteristics, length and points at which such power impulses are applied, and result in a violent vibration of the entire structure. This critical point, or harmonic vibration, is analogous to the cumulative effect that proper periodic applications of power to a pendulum have on its amplitude of swing. In the crank shaft this torsional vibration is highly objectionable and it is the purpose of this invention to eliminate the same and provide smooth operation over the entire range of speed.

The manner in which this is accomplished is by providing a device which has an inertia of rotation, different for each speed, and as the motor changes speed, it must overcome the inertia of the device. In this manner, inherent oscillations will be damped out and the above named operation achieved.

For a more detailed description of the device reference will now be had to the accompanying drawings forming a part hereof, wherein:—

Figure 1 is a front sectional elevation of one form of the device taken on the section 1—1 of Figure 2.

Figure 2 is a side sectional elevation of the device of Figure 1 and taken on the line 2—2 of Figure 1.

Figure 3 is a section taken on the line 3—3 of Figure 1.

In the device shown in Figures 1, 2 and 3, shaft $g$ carries disc $h$, secured thereto by flange $i$, bolts $i'$ and pin $i^2$. At the periphery of the disc a cylindrical flange $l$ is formed and at its center a hub $h^4$ is provided. The housing formed by the disc and flange is closed by a face plate $h'$.

Cylindrical flange $h$ carries seats $h^2$ on its internal periphery and on the hub are provided seats $h^3$ radially disposed with respect to those on the flange and co-operating with the latter. Mounted in each seat is an annulus of rubber or other resilient material $j$ and between each opposed pair of annuli is positioned a weight $k$. This weight may consist of a cylindrical section supplemented by a cylindrical pin or stud $k'$ on either of the flat surfaces of the weight $k$. These pins or studs are received by the hollow portions of the resilient elements and, when assembled, constitute supporting means for the individual weight or inertia elements.

It will be observed that when the crank shaft is rotated, the weights will fly outwardly and compress the rubber $j$. The greater the speed of rotation the greater will be the inertia of the weights due to their increased distance from the center of rotation. In order that the speed of rotation be changed, this inertia must first be overcome and in this manner torsional vibrations are effectively damped. This is shown graphically by the comparative circles $x$ and $y$ which represent the path of the centers of mass of the weights for two different uniform speeds of rotation of the shaft $g$.

From the above it will be seen that a vibration damping device has been provided, operating on the inertia principle, which effectively eliminates the objectionable characteristics of motor operation noted above.

What I claim is:

1. A vibration damping device comprising a rotating member, a plurality of radially opposed seats on said member, inertia means, and yielding means mounting said inertia means between said seats.

2. A vibration damping device comprising a rotating member, a plurality of radially opposed seats on said member, inertia means, and annuli of yielding non-metallic material mounted in said seats and supporting the inertia members between opposed yielding elements.

3. A vibration damping device comprising a rotating member, a plurality of radially opposed seats on said member, inertia means, recessed blocks of yielding non-metallic material disposed within the seats, and means on the inertia means to engage the recesses in the yielding material, whereby the inertia means are secured therebetween.

4. A vibration damping device comprising a rotating member, a hub on the member, a disc secured thereto, a cylindrical flange formed at the periphery of the disc, seats formed on the hub, opposed seats formed on the inner surface of the flange, recessed blocks of yielding non-metallic material disposed within the seats, inertia means, and stub shafts formed on the inertia means and received by the recesses in the yielding material, whereby the inertia means are secured therebetween.

5. A vibration damping device comprising a rotating member, a hub on the member, a disc secured thereto, a cylindrical flange formed at the periphery of the disc, seats formed on the hub, opposed seats formed on the inner surface of the flange, recessed blocks of yielding non-metallic material disposed within the seats, a face plate to close the housing formed by the disc and flange, inertia means, and stub shafts formed on the inertia means and received by the recesses in the yielding material, whereby the inertia means are secured therebetween.

This specification signed this 10th day of November, A. D. 1926.

ALFRED F. MASURY.